United States Patent [19]

Lingl

[11] 4,112,033
[45] Sep. 5, 1978

[54] METHOD OF USING SLUDGE FOR MAKING CERAMIC ARTICLES

[75] Inventor: Hans Lingl, Neu-Ulm, Ludwigsfeld, Fed. Rep. of Germany

[73] Assignee: Lingl Corporation, Paris, Tenn.

[21] Appl. No.: 478,038

[22] Filed: Jun. 10, 1974

[30] Foreign Application Priority Data

Jul. 17, 1973 [DE] Fed. Rep. of Germany ....... 2326267

[51] Int. Cl.$^2$ .................... C04B 33/32; C04B 35/64
[52] U.S. Cl. ....................................... 264/44; 106/72; 106/73.6; 264/56; 264/64
[58] Field of Search ................. 264/29, 56, 333, 44, 264/64; 106/71, 72, 73.6

[56] References Cited

U.S. PATENT DOCUMENTS

| 172,357 | 1/1976 | Walsh | 106/71 |
| 3,886,244 | 5/1975 | Bayer et al. | 264/63 |
| 3,886,245 | 5/1975 | Bayer et al. | 264/56 |

FOREIGN PATENT DOCUMENTS

| 733,666 | 3/1943 | Fed. Rep. of Germany. |
| 1,292,570 | 4/1969 | Fed. Rep. of Germany. |

OTHER PUBLICATIONS

H. H. Nakamura et al., "Use of Bauxite Wastes for Lightweight Building Products", Ceramic Bulletin, No. 50, Mar. 1971, pp. 248–250.

*Primary Examiner*—Thomas P. Pavelko
*Attorney, Agent, or Firm*—Cushman, Darby & Cushman

[57] ABSTRACT

A method of utilizing sewage and/or industrial, e.g. poisonous sludges for making bricks or other ceramic articles. Sludge is mixed with clay to form a mixture of approximately 30 to 50% sludge. The mixture may then be stored, and is extruded by conventional means. After extrusion and cutting or shaping, the articles are dried in a dryer and fired in a kiln. Preferably, the exhaust gases from the dryer are vented into the kiln as combustion gases, where odors or poisonous compounds of the exhaust air are destroyed. Also, used or waste oil may be added during mixing to lessen odors and to supply extra heat during firing in the kiln. The products so produced are substantially indistinguishable from conventional products, except that their insulating properties are enhanced.

7 Claims, 3 Drawing Figures

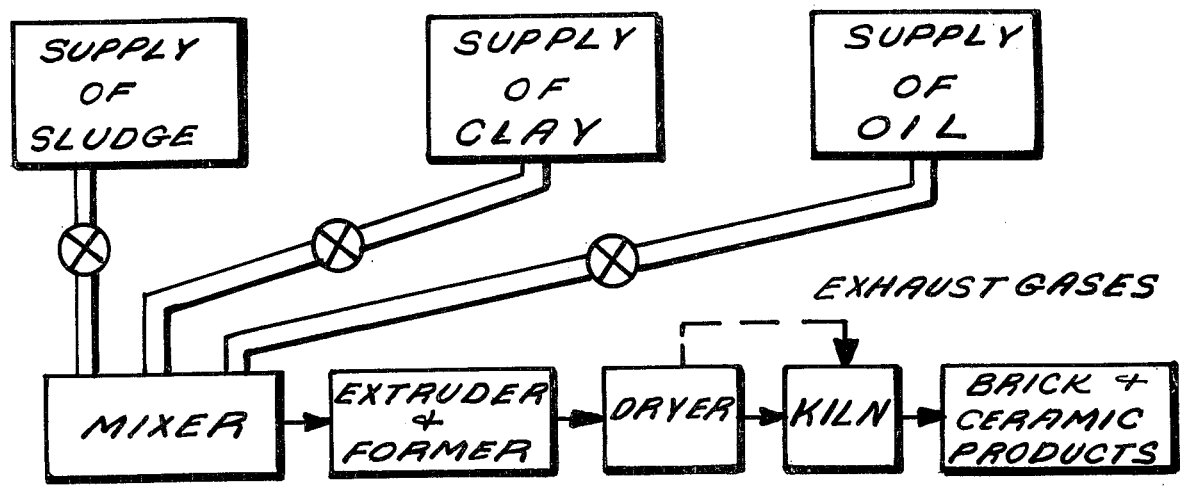
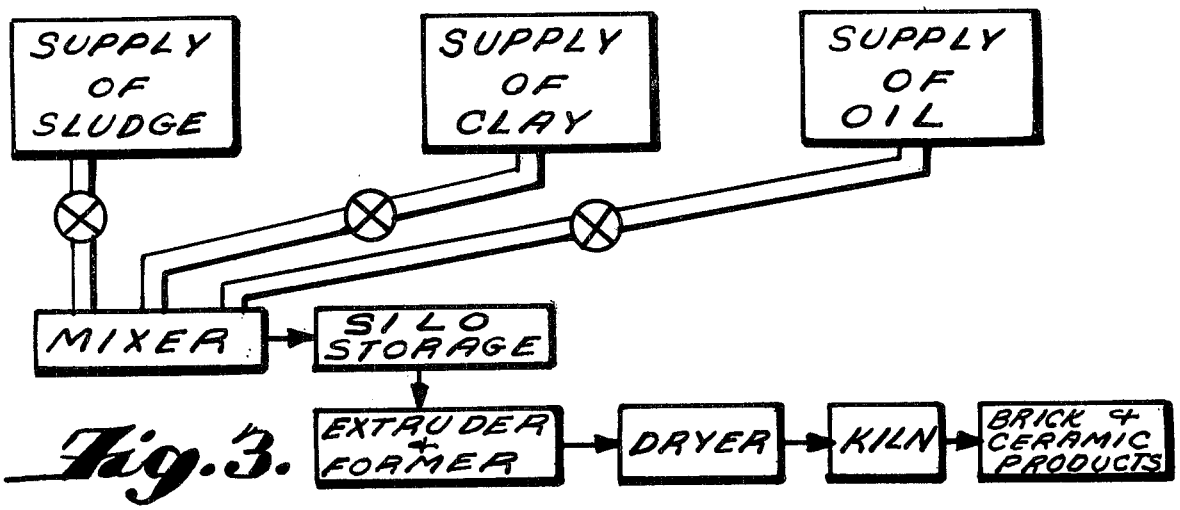
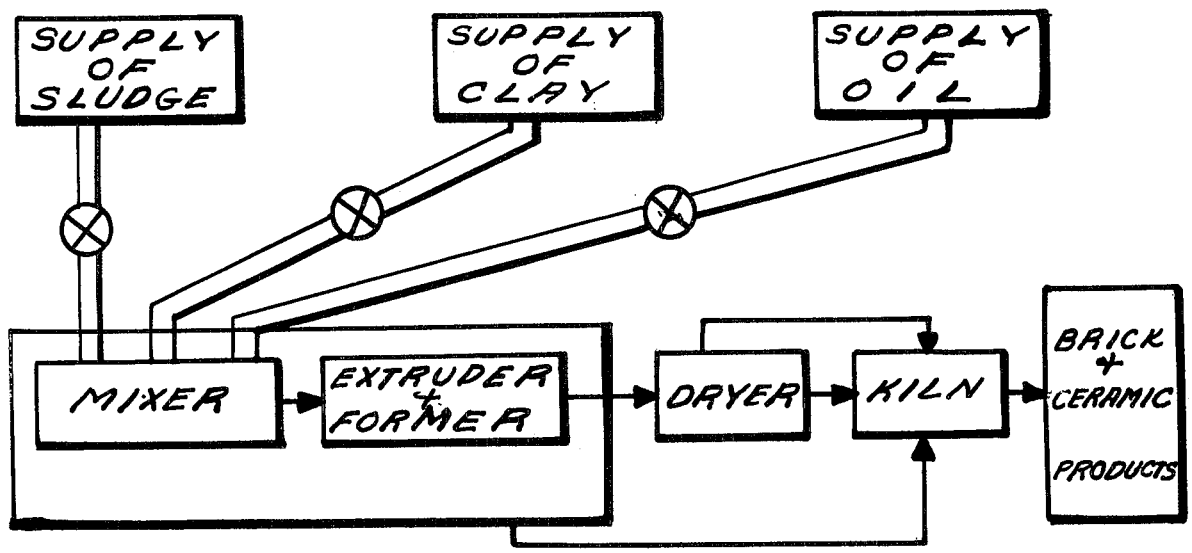

METHOD OF USING SLUDGE FOR MAKING CERAMIC ARTICLES

BACKGROUND OF THE INVENTION

The invention relates to a method of disposing of waste sludge such as industrial sludges (for example, poisonous metallic sludges) and sewage sludge in an environmentally sound manner. In the past the disposal of such sludges has been a major problem confronting municipalities and other sewage treatment plant operators. Disposal techniques have included incineration, landfilling, composting, or merely dumping the sludge into waterways. As opposed to most of the prior art techniques, according to the teachings of the present invention, the sludge is treated as a resource rather than as a disposal problem, and a valuable end product is produced thereby.

In the making of ceramic articles, and especially in the making of insulating bricks, the use of sewage sludge with clay to form the material from which the ceramic articles are to be made does not affect the desirable physical properties of the final article produced. In fact, in the production of insulating bricks, organic material is often conventionally added to the clay and then during firing in a kiln the organic material is oxidized to produce a final product with good insulating properties.

In the past, there has also been a problem in disposing of used oil from automobiles and other vehicles, and from various industrial machinery and processes. If the oil is released into the environment, pollution will result. Although recycling of such oil is feasible under many circumstances, harmful chemicals may be released during the recycling process, and market demand for the end product is not always sufficient to justify the expense necessary to set up a recycling plant. Again according to the teachings of the present invention the used oil is utilized as a resource rather than treated as a disposal problem. When mixed with clay and sewage sludge, it reduces the odor associated with the sludge and assists in firing the kiln. In addition, burning of used oil may be the primary method of firing the kiln.

SUMMARY OF THE INVENTION

The method according to the teachings of the present invention allows handling of industrial sludges (for example poisonous metallic sludges) and sewage sludge without human contact to form ceramic articles, and requires only minor adaptation of the normal methods and apparatus for producing the ceramic articles. Such sludges are mixed with clay in conventional mixing equipment (such as double shaft mixers). The components are fed to the mixer automatically by conventional conveyances. Preferably, the moisture content of the sludge should not be greater than 50% so that a large quantity of sludge can be added to the clay without producing a mixture that is too soft for extrusion. Also, although any type of clay normally used for producing ceramics is suitable, it is preferred that the clay be low in moisture content. The amount of clay and sewage sludge that will be mixed together is dependent upon the relative properties of the clay and the sewage sludge. They may be mixed together in any proportions as along as the mixture produced thereby is extrudable with conventional extruding means to form an extrusion that has sufficient form and dimensional stability to be fired and acted upon further to produce the desired finished article, however, in practice the amount of sewage sludge utilized is preferably 30–50%. Sewage sludge normally contains a large number of alkali minerals, which when mixed with clay having a low content of such minerals produces a mixture that will produce products with especially good ceramic characteristics.

After mixing, the mixture formed thereby is preferably stored in a silo from which it may be fed to the extruding equipment. Storing before extrusion helps stabilize the mixture to insure even feed and a trouble-free extrusion process. The extrusion too may be performed by any conventional extruding means. After extrusion, the material may be cut or formed by the usual conventional techniques into any desired shape for subsequent drying or firing to produce an article of the required dimensions and shape. Again, the cutting is performed with any suitable conventional equipment.

Once the material is in its desired form, it is dried in a conventional dryer and fired in a conventional kiln. Because the exhaust gases from the dryer will have large numbers and quantities of aromatic compounds associated therewith, it is preferable that a tunnel dryer and a tunnel kiln be used. By utilizing this equipment, venting of the exhaust gases into the kiln - rather than to the atmosphere - is greatly facilitated. In the kiln, where temperatures are typically 1830° F or higher, the aromatic compounds are burned, providing additional heat for the kiln, and obviously all pathogens and other harmful components are completely destroyed.

In the kiln, in addition to the aromatic compounds in the dryer exhaust gases being burned, the organic portion of the sludge incorporated into the bricks being fired will be oxidized, resulting in dead air spaces which improve the insulating properties of the bricks, and the mineral compounds of the sludge are transformed into compounds with the basic ceramic materials that are harmless. This is accomplished by the large masses of material being subjected to the high temperatures and long firing times normally associated with brick and ceramic manufacture. It will thus be seen that sludge can readily be utilized in brick or ceramic manufacture without modifying the normal automatic equipment used in brick manufacture except to add a conventional conveyance means for automatically transporting the sludge to the mixer, and preferably a suitable ducting means for venting the exhaust gases from the dryer to the kiln if they are not already so vented.

At the mixing step, in addition to adding sludge, oil may also be added. The quantity of oil that is added depends upon the type and grain size distribution of the clay, and again it is only necessary that the mixture produced be readily extrudable by conventional means to produce an extrusion that has sufficient form and dimensional stability to be fired and acted upon further to produce a given desired finished article. The used oil performs two functions when added to the mix — it reduces the odor from the sewage sludge component of the mix, and it provides supplementary fuel for firing in the kiln. The used oil contained within the extruded product will be burned when the product is fired in the kiln. Many additives in the used oil, which are the major source of pollution and cause the most difficulties during other methods of used oil utilization, are merely transformed into compounds incorporated within the ceramic or brick product. It is noted that it is also possible to provide all the energy for firing the kiln by burning used oil in addition to incorporating some oil in the mix. This permits an even larger scale utilization of a normally environmentally undesirable material.

In addition to using sewage sludge from conventional sewage treatment plants, the method according to the present invention may also utilize industrial chemical and poisonous sludges. Chemical sludges are often produced by processes characterized by the presence of metal hydroxides, such as chrome oxides. An example of a poisonous sludge is cyanide sludge. In the cases where the sludges contain extremely toxic substances, it is necessary to mix and extrude the mixture in means equipped with exhaust systems so that any toxic gases may be vented into the kiln where they are oxidized or formed into inert compounds. Of course in such a situation it would also be necessary to vent the dryer exhaust gases into the kiln.

It should be stressed that the end products produced by the method according to the teachings of the present invention are in no way inferior to similar products produced without the addition of sludge to the clay. In shape, color, odor, feel, compressive strength and substantially all other physical properties bricks and other ceramic articles produced according to the teachings of the present invention are virtually the same as conventional bricks - in fact the insulating properties of the bricks are enhanced. Since no human contact is necessary in effecting the method of the present invention, and since all materials are contained within closed chambers until the final product is produced and all exhaust gases are burned, there is no health hazard associated with the method of the invention, and there are no undesirable odors that escape from the immediate vicinity of the production facilities.

BRIEF DESCRIPTION OF THE DRAWINGS

FIGS. 1, 2 and 3 are block diagrams showing diagrammatically apparatus for practicing various modifications of the method according to the teachings of the present invention.

DETAILED DESCRIPTION OF THE DRAWINGS

FIG. 1 diagrammatically shows apparatus for practicing a preferred method according to the teachings of the present invention. Sludge, clay, and used oil are all fed from sources of supply by conventional automatic means to a mixer. After mixing, the mixture is conveyed to a conventional extruder and former, and the articles so formed are then conveyed on to a dryer. As shown in dotted line, the exhaust gases from the dryer may be vented to the kiln as combustion gas for the kiln. After drying, the articles are conveyed to the kiln for firing, and the final products thus result.

FIG. 2 diagrammatically shows the same apparatus as does FIG. 1 with the addition of a silo for storage of the mixture between the mixing and extruding steps. As stated above, storing helps stabilize the mixture and insures that the extrusion process will be trouble-free.

FIG. 3 diagrammatically shows apparatus for effecting the method of the invention when poisonous sludges are used. As can be seen, the exhaust gases from the mixing, extruding-forming, and drying stages must be vented to the kiln where they are oxidized or made inert instead of venting them to the atmosphere. This invention is especially valuable for ecological disposal of poisonous industrial waste sludges. Cyanide sludge, for example, cannot be disposed of in Germany if the cyanide content is above 5 milligrams per kilogram of material. Sludges with content in excess of 5 milligrams have to be cast in concrete and deposited in oceans. With this invention such cyanide sludges are mixed into the clay in such a percentage that the cyanide content would be under the permitted limit of 5 milligrams per kilogram of material, so that this waste can be used with this invention for the production of brick, however, only on the condition that such production is completely automated, to avoid contact of humans with the toxic material, and that the exhaust gases from the dryer in their toxic conditions are transferred into the kiln to be neutralized. Cyanide decomposes and becomes inert above 1,440° F. The same is true for arsenic sludges, which can be destroyed by utilization in brick production according to the above teachings of this invention.

Metallic hydroxide sludges, for example with chrome or manganese, which oxidize in storage to $CRO_6$ and which are poisonous in this condition are non-toxic in their fresh condition and are converted with a clay compound, for example $Al_2O_3 2SiO_2$, to form new compounds which are inert. The whole group of metal hydroxides, therefore, can be recycled with this invention making bricks.

Sludge of calcium carbonate can be utilized with this invention in large quantities, together with clays with low carbonate content for the production of, for example, large multicored blocks for load bearing purposes which would usually not have to be burned to a dense vitrified body, since the carbonate content will increase the load bearing capacity of the block and reduce the brittleness of the material.

Sewage sludge can be utilized in the production of large hollow blocks up to a compound of 40% sewage sludge, producing bricks with relatively reduced load bearing capacity, but high insulating capacity, since the organic compound of sewage sludge is fine enough to produce only small pores.

EXAMPLE

Insulating bricks were produced according to the teachings of the present invention. Sewage sludge having an approximate moisture content of 20% was mixed with brick clay in a conventional clay preparation system mixer in the ratio of 35:65. Residual oil comprising approximately 10% of the volume of the mix was also added during the mixing. The mixture so formed was then stored in a conventional silo for a period of approximately 24 hours, and then was extruded by an extruder, and the extrusion column was cut into standard insulating brick sizes. The bricks were then advanced to a continuous dryer, and the exhaust gases from the dryer were vented into a tunnel kiln. The temperature within the kiln was 1830° F, and each brick was in the tunnel for approximately 45 hours. The bricks so produced were indistinguishable from similar bricks produced without the addition of sewage sludge, except that they had enhanced insulating properties.

It will be seen that a method has been disclosed for utilizing sewage sludge as a resource. While the invention has been disclosed in what is presently conceived to be the most practical and preferred embodiments, it is apparent that many modifications could be made thereof within the scope of the invention, which scope is not to be limited except by the appended claims.

What is claimed is:

1. A method for producing brick or other ceramic products from sewage sludge having environmentally harmful and/or toxic substances therein, said method comprising the steps of automatically:
 (a) mixing sewage sludge with clay in a mixer,
 (b) extruding and forming articles from the mixture so formed,
 (c) drying said articles in a dryer,
 (d) firing said articles in a kiln, whereby ceramic products free from odors or harmful materials normally associated with sewage sludge and having substantially the same physical properties as normal ceramic products are produced from said articles, and
 (e) venting the exhaust air from the dryer into the kiln as combustion air for the kiln, whereby all aromatic compounds in the exhaust air are destroyed.

2. A method of producing insulating bricks from sewage sludge, said method comprising the steps of automatically:
 (a) mixing sewage sludge with clay in a mixer,
 (b) extruding the mixture so formed,
 (c) cutting said extruded mixture into bricks,
 (d) drying said bricks so formed in a dryer,
 (e) firing said bricks in a kiln, whereby bricks free from harmful materials or odors normally associated with sewage sludge and having improved insulating properties are produced, and
 (f) venting the exhaust air from the dryer into the kiln as combustion air for the kiln, whereby all aromatic compounds in the exhaust air are destroyed.

3. A method of producing bricks or other ceramic articles from sludge having environmentally harmful and/or toxic substances therein, comprising the steps of automatically:
 (a) mixing sludge with clay in a mixer having an exhaust system,
 (b) extruding the mixture so formed in an extruder having an exhaust system, and forming articles from said mixture,
 (c) drying said articles so formed in a dryer having an exhaust system,
 (d) venting the exhaust gases from said mixer, extruder and dryer exhaust systems to a kiln, and
 (e) firing said articles in said kiln.

4. A method as recited in claim 3 wherein said sludge has a moisture content of 50% or less, and wherein said sludge comprises approximately 30–50% of said mixture.

5. A method as recited in claim 3 comprising the further step of storing the mixture of sludge and clay before extruding and forming.

6. A method as recited in claim 3 comprising the further step of mixing used oil with the clay and sludge during mixing, whereby said used oil reduces the odor associated with the mixture so formed and also assists in firing the kiln.

7. A method as recited in claim 6 comprising the further step of firing said kiln with used oil.

* * * * *

UNITED STATES PATENT AND TRADEMARK OFFICE
CERTIFICATE OF CORRECTION

PATENT NO. : 4,112,033
DATED : September 5, 1978
INVENTOR(S) : Hans Lingl, Sr.

It is certified that error appears in the above-identified patent and that said Letters Patent are hereby corrected as shown below:

Page 1, data item [30], change "2326267" to --2336267--.

Signed and Sealed this

Twentieth Day of March 1979

[SEAL]

Attest:

RUTH C. MASON
Attesting Officer

DONALD W. BANNER
Commissioner of Patents and Trademarks